No. 762,891. PATENTED JUNE 21, 1904.
G. L. ENGLUND.
HARVESTER REEL.
APPLICATION FILED JUNE 27, 1903.
NO MODEL. 3 SHEETS—SHEET 1.

Witnesses
A. H. Opsahl.
H. D. Kilgore

Inventor.
Gust L. Englund
By his Attorneys.
Williamson & Merchant

No. 762,891. PATENTED JUNE 21, 1904.
G. L. ENGLUND.
HARVESTER REEL.
APPLICATION FILED JUNE 27, 1903.
NO MODEL. 3 SHEETS—SHEET 2.

Witnesses.
A. H. Opsahl.
N. D. Kilgore.

Inventor.
Gust. L. Englund
By his Attorneys.
Williamson Merchant

No. 762,891. PATENTED JUNE 21, 1904.
G. L. ENGLUND.
HARVESTER REEL.
APPLICATION FILED JUNE 27, 1903.

NO MODEL. 3 SHEETS—SHEET 3.

Witnesses.
A. H. Opsahl.
N. D. Kilgore

Inventor.
Gust. L. Englund.
By his Attorneys.
Williamson & Merchant

No. 762,891. Patented June 21, 1904.

UNITED STATES PATENT OFFICE.

GUST L. ENGLUND, OF CRAWFORD, SOUTH DAKOTA.

HARVESTER-REEL.

SPECIFICATION forming part of Letters Patent No. 762,891, dated June 21, 1904.

Application filed June 27, 1903. Serial No. 163,287. (No model.)

*To all whom it may concern:*

Be it known that I, GUST L. ENGLUND, a citizen of the United States, residing at Crawford, in the county of Roberts and State of South Dakota, have invented certain new and useful Improvements in Harvester-Reels; and I do hereby declare the following to be a full, clear, and exact description of the invention, such as will enable others skilled in the art to which it appertains to make and use the same.

My invention relates to harvesters, and has for its object to provide an improved reel and means for adjusting and driving the same.

To the above ends the invention consists of the novel devices and combinations of devices hereinafter described, and defined in the claims.

The invention is illustrated in the accompanying drawings, wherein like characters indicate like parts throughout the several views.

Figure 1:
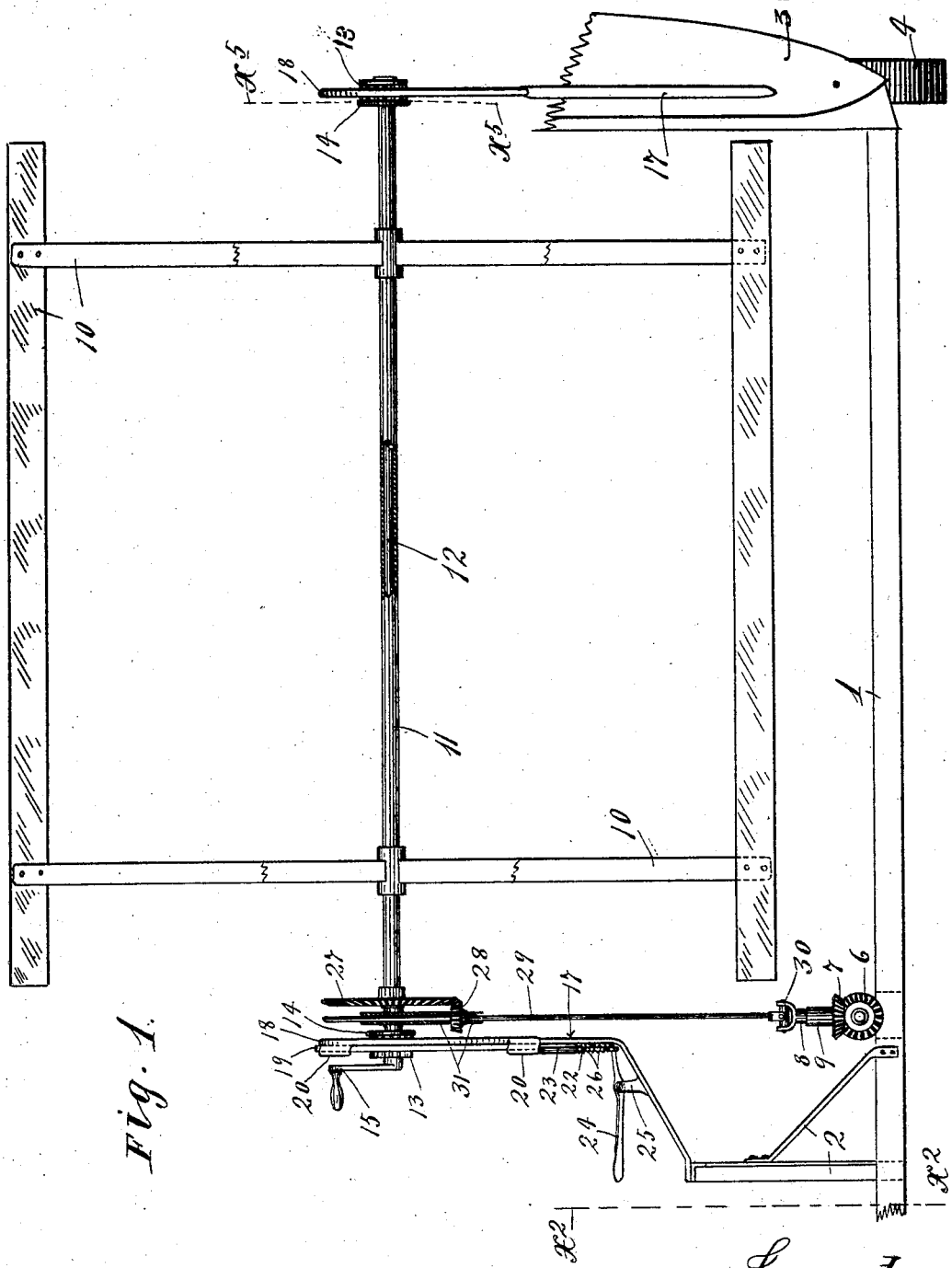
Figure 2:
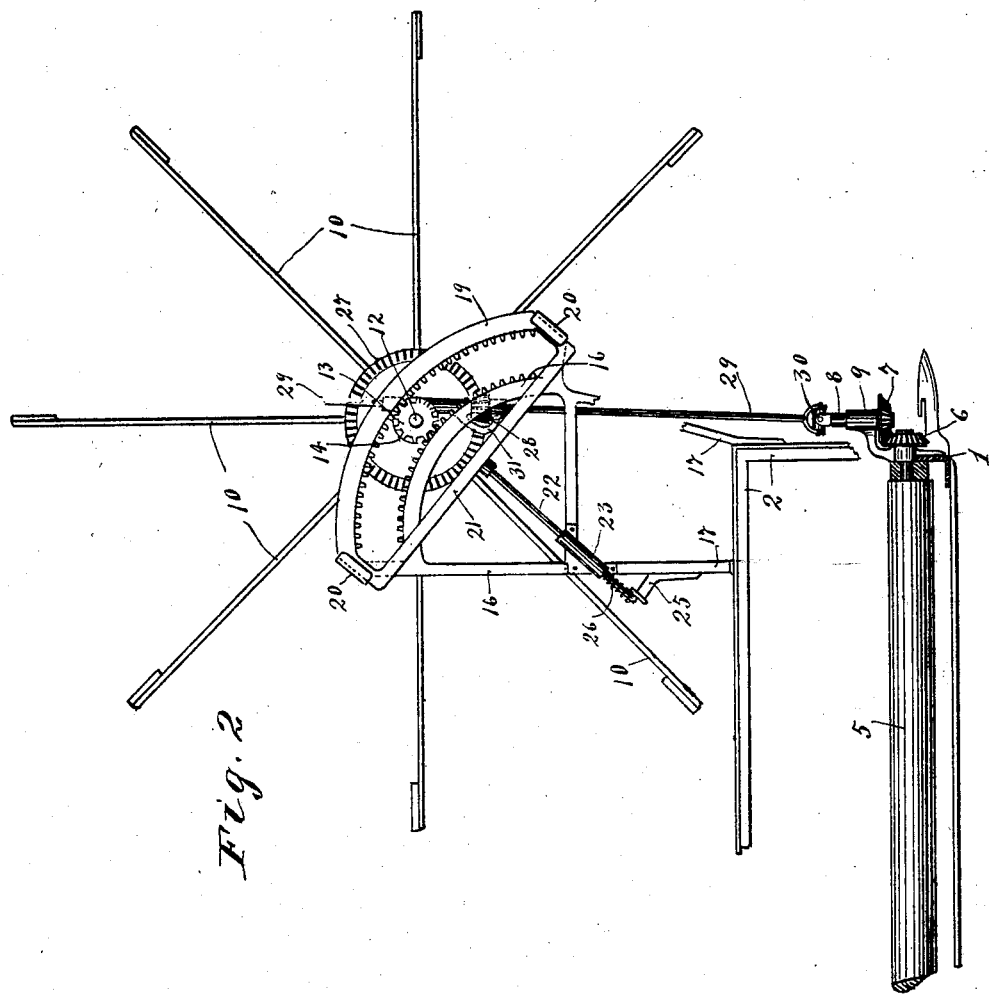
Figure 3:
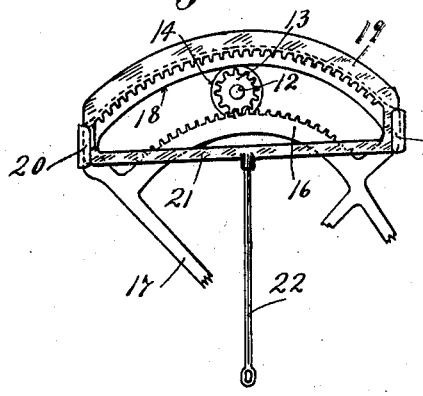
Figure 4:
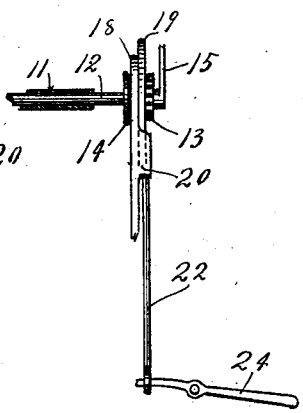
Figure 5:
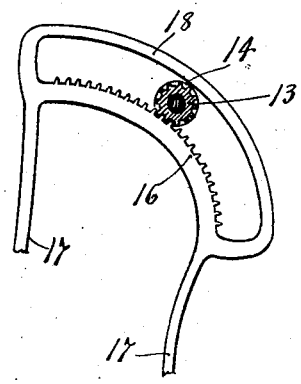

Figure 1 is a view in front elevation with some parts broken away and some sectioned, showing a portion of a harvester having my improved reel applied thereto. Fig. 2 is a vertical section with parts broken away, taken approximately on the line $x^2 x^2$ of Fig. 1. Fig. 3 is a view in side elevation of certain of the parts shown in Fig. 2. Fig. 4 is a front elevation of the parts shown in Fig. 3, some parts being sectioned and others broken away; and Fig. 5 is a section on the line $x^5 x^5$ of Fig. 1.

Of the parts of the harvester shown the numeral 1 indicates the platform-frame, the numeral 2 the seat-supporting frame, the numeral 3 the grain-board, the numeral 4 the grain-wheel, and the numeral 5 the forward member of the platform canvas-rollers. The roller 5, as is usual, receives a positive rotation under the advance movement of the machine. The forwardly-projecting trunnion of the roller 5 is provided with a beveled gear 6, which meshes with the bevel-gear 7 of the short shaft 8, mounted in a bearing 9, supported by the platform-frame 1.

The numeral 10 indicates the reel, the arms of which are carried by a tubular shaft 11, which in turn is loosely mounted on a bearing-shaft 12. The bearing-shaft 12 is provided at its ends with pinions 13, formed with side flanges 14. Also at its left-hand end as viewed in Fig. 1 the bearing-shaft 12 is provided with a crank 15, by means of which it may be turned. The pinions 13 work over segmental racks or gears 16, supported by brackets 17, one from the seat-supporting bracket 2 and the other from the grain-board 3. Each toothed segment 16 has a segmental guard-strap 18, which overlies the coöperating pinion and keeps the same in mesh with the teeth of the coöperating tooth-segment.

A toothed lock-segment 19 coöperates with the inner or left-hand pinion 13 and corresponding teeth 16 to lock the reel in any set position or adjustment. The ends of the lock-segment 19 slide in keepers 20, formed on the end portions of the coöperating segment 16, as best shown in Figs. 2 and 3. A bar 21 connects the ends of the segment 19, and to the intermediate portion of this bar is connected a plunger 22, that extends radially of the segment 19 and works through a bearing 23, secured on the left-hand bracket 17. An operating-lever 24 is fulcrumed to a lug 25 on the left-hand bracket 17 and is attached to the lower end of the plunger 22. A coiled spring 26 on the plunger 22, compressed between the bearing 23 and the attached end of the lever 24, yieldingly draws down the toothed lock-segment 19 and holds the same in mesh with the left-hand pinion 13.

At its left-hand end the hollow shaft or sleeve 11 of the reel is provided with a beveled gear 27, which meshes with a beveled pinion 28, that is mounted to freely slide on, but to rotate with, an oscillating shaft 29. The lower end of the shaft 29 is connected to the short shaft 8 by a knuckle-joint 30, while the upper portion thereof is mounted to rotate in and slide through a bearing-sleeve 31, the hub of which is pivoted on the shaft 12 between the pinion 13 and the adjacent gear 27. The sleeve 31 is divided, so as to engage the shaft 29 both above and below the pinion 28 and is thus made to hold the pinion in proper working position.

The flanges 14 of the pinions 13 coöperate with the toothed segment 16 to hold the shaft 12 against endwise movements. As is evident, when the left-hand pinion 13 is engaged by the lock-segment 19 and of course also with the coöperating segment 16 it cannot turn, and hence holds the shaft 12 against rotation, and consequently the reel in the particular set adjustment. When, however, the lock-segment 19 is raised so that its teeth will clear the teeth of the coöperating pinion 13, the operator taking hold of the crank 15 may rotate the reel-supporting shaft 12 and bring the reel to any desired adjustment. Under such movements of the shaft 12 the two coöperating pinions 13 and toothed segments 16 cause the shaft 12, and consequently the reel, to move always parallel to original position, or, in other words, to always maintain a horizontal position. The lock-segment 19 is quickly raised by pressing downward on the key end of the lever 24, and it is automatically thrown back into locking position by the spring 26 as soon as the lever 24 is released. Under the above manipulations the reel may be quickly adjusted from one position to another and quickly and securely locked in any desired position. The connections described for driving the reel will, as is evident, adapt themselves to all positions of the reel without interruption or change in their driving action. The devices for adjusting the reel and for locking and driving the same are of small cost and are thought to be efficient for the purposes in view. They are of course capable of modification within the scope of the invention as herein set forth and claimed.

What I claim as new, and desire to secure by Letters Patent of the United States, is—

1. The combination, with a reel, of means for supporting the same, comprising a pair of toothed segments or sections, a reel-supporting shaft having pinions meshing with the said toothed segments, and a movable lock-segment or toothed section coöperating with one of the aforenoted toothed sections to clamp and lock the coöperating pinion, substantially as described.

2. The combination, with a pair of toothed supporting-segments having overlying segmental guard-straps 18, of a reel, a shaft supporting said reel and provided at its ends with pinions meshing with said supporting-segments and guided by said guard-straps 18, and a relatively movable toothed lock-segment coöperating with one of the said toothed supporting-segments to clamp the coöperating pinion and lock the reel-supporting shaft in any set adjustment, substantially as described.

3. The combination, with a pair of toothed supporting-segments 16, having the overlying guard-straps 18, of a reel, a reel-supporting shaft having pinions meshing with said segments 16 and guided by said straps 18, a spring-held toothed lock-segment mounted on one of said supporting-segments for coöperation therewith to clamp the coöperating pinion, and a lever for releasing said lock-segment from said pinion, substantially as described.

In testimony whereof I affix my signature in presence of two witnesses.

GUST L. ENGLUND.

Witnesses:
W. E. BURTON,
C. J. RALSTON.